United States Patent
Cromer et al.

(10) Patent No.: US 7,085,289 B2
(45) Date of Patent: Aug. 1, 2006

(54) BANDWIDTH THROTTLE FOR A WIRELESS DEVICE

(75) Inventors: Daryl Carvis Cromer, Apex, NC (US); Howard Jeffrey Locker, Cary, NC (US); Philip John Jakes, Durham, NC (US)

(73) Assignee: International Business Machines Corporation, Armonk, NY (US)

( * ) Notice: Subject to any disclaimer, the term of this patent is extended or adjusted under 35 U.S.C. 154(b) by 953 days.

(21) Appl. No.: 10/112,126

(22) Filed: Mar. 29, 2002

(65) Prior Publication Data

US 2003/0186703 A1 Oct. 2, 2003

(51) Int. Cl.
*H04J 3/16* (2006.01)
(52) U.S. Cl. .................... 370/468; 455/452.2
(58) Field of Classification Search ........... 370/395.21, 370/318; 455/452–453, 412.2
See application file for complete search history.

(56) References Cited

U.S. PATENT DOCUMENTS

| | | | |
|---|---|---|---|
| 5,560,021 A | | 9/1996 | Vook et al. |
| 5,590,396 A | | 12/1996 | Henry |
| 5,657,317 A | | 8/1997 | Mahany et al. |
| 5,838,720 A | | 11/1998 | Morelli |
| 5,845,215 A | | 12/1998 | Henry et al. |
| 5,940,771 A | | 8/1999 | Gollnick et al. |
| 5,949,812 A | | 9/1999 | Turney et al. |
| 5,974,558 A | | 10/1999 | Cortopassi et al. |
| 5,982,813 A | * | 11/1999 | Dutta et al. .................. 375/219 |
| 5,987,338 A | | 11/1999 | Gibbons et al. |
| 6,002,918 A | | 12/1999 | Heiman et al. |
| 6,058,289 A | | 5/2000 | Gardner et al. |
| 6,157,845 A | | 12/2000 | Henry et al. |
| 6,192,230 B1 | * | 2/2001 | van Bokhorst et al. .. 455/343.3 |
| 6,236,674 B1 | | 5/2001 | Morelli et al. |
| 6,272,117 B1 | * | 8/2001 | Choi et al. .................. 370/330 |

(Continued)

FOREIGN PATENT DOCUMENTS

CA 2084441 8/1993

(Continued)

OTHER PUBLICATIONS

Affordable QoS in future wireless networks myth or reality ? Personal, Indoor and Mobile Radio Communications, 2001 12th IEEE International Symposium on vol. 1, Sep. 30-Oct. 3, 2001 pp.:C-39-C-43 vol. 1 Digital Object Identifier 10.1109/PIMRC.2001.*

(Continued)

*Primary Examiner*—Hassan Kizou
*Assistant Examiner*—Salman Ahmed
(74) *Attorney, Agent, or Firm*—J. Bruce Schelkopf; David Irvin; Dillon & Yudell LLP

(57) ABSTRACT

A method and system for conserving battery strength of a client device, such as a laptop computer, on a wireless local area network (WLAN). The client device monitors the addresses of incoming data packet messages while running at a lowest bandwidth permitted by the protocol of the client device. When a data packet is detected that is addressed to the client device, the client device bandwidth is increased to a higher bandwidth to receive subsequent data packets. Subsequent incoming data packets are received by the client device until transmissions cease, after which the client device returns to the lowest bandwidth. By remaining in a lowest bandwidth mode while monitoring incoming packets, the client device is able to extend the life of the client device battery.

16 Claims, 2 Drawing Sheets

U.S. PATENT DOCUMENTS

| | | | |
|---|---|---|---|
| 6,687,348 B1 * | 2/2004 | Cromer et al. | 379/102.04 |
| 6,707,862 B1 * | 3/2004 | Larsson | 375/326 |
| 6,898,438 B1 * | 5/2005 | Uchida | 455/522 |
| 2003/0086443 A1 * | 5/2003 | Beach | 370/516 |
| 2003/0109260 A1 * | 6/2003 | Fisher | 455/452 |
| 2005/0096078 A1 * | 5/2005 | Choi et al. | 455/522 |

FOREIGN PATENT DOCUMENTS

| | | | |
|---|---|---|---|
| EP | 615364 A1 * | 9/1994 | |
| EP | 0650279 A1 | 4/1995 | |
| GB | 2293295 A | 3/1996 | |
| JP | 11127165 A | 5/1999 | |
| WO | WO9716012 A1 | 5/1997 | |
| WO | WO9835453 A1 | 8/1998 | |
| WO | WO0052948 A1 | 9/2000 | |
| WO | WO9955031 A1 | 10/2000 | |
| WO | WO0111767 A1 | 2/2001 | |
| WO | WO0072615 A1 | 9/2001 | |

OTHER PUBLICATIONS

"Low Power Macrolayer for Wireless Communication"; IBM Technical Disclosure Bulletin; vol. 39; No. 07; Jul. 1996.

* cited by examiner

BANDWIDTH THROTTLE FOR A WIRELESS DEVICE

BACKGROUND OF THE INVENTION

1. Technical Field

The present invention relates in general to the field of computers, and, in particular, to wireless devices. Still more particularly, the present invention relates to an improved method and system for reducing power consumption of a wireless device in a Local Area Network (LAN).

2. Description of the Related Art

Computer networks have greatly enhanced the computing power available to an individual computer by linking the individual computer to other computers and devices. Not only do networks provide for the exchange of information between autonomous computers, but they also enable each "node" in the network to share resources common to the entire network. Each node may be a computer, a data storage area, an output device such a printer or an interface to another network such as the Internet. Through resource sharing, application programs, databases and physical equipment in the network may be made available to any node without regard to the physical location of the node.

There are generally two types of network interconnections for connecting nodes. The nodes in a wired network communicate among themselves by using transmission lines, either electrical or optical, to carry signals between nodes. The nodes in a wireless network, on the other hand, communicate between nodes using radio frequency signals or other types of wireless communication media.

One type of wireless network is a wireless local area network (WLAN). WLAN's typically use high-frequency radio waves carrying digital data to communicate between nodes. Nodes in the WLAN communicate via transceivers at each node. Each transceiver both transmits and receives radio waves containing digital data. All nodes are within relatively close proximity to one another, such as within a building or an educational campus. The proximity of the nodes permits the network to operate reliably at low power and at high data rates. In a WLAN, nodes are typically defined as either an access point or a client device.

An access point is a stationary server computer providing an infrastructure and access point for client devices. That is, the access point coordinates with other access points to control the flow of data between access points and from access points to client devices. Data delivered to the client devices may be from a server on the WLAN, or more typically, from a remote source such as an Internet.

Client devices are typically mobile computing devices such as laptop computers, personal digital assistants (PDA's), etc., which are typically battery powered. While such units may run for several hours if only running a local stand-alone application, transceiving radio signals across the WLAN, such as prescribed by IEEE Standard 802.11b, can double the power requirement of the unit, thus reducing the unit's effective battery life by 50%. When the battery of the client device is effectively discharged, the client device can no longer be used for computing or communicating with the WLAN, and important data and/or work may be lost. A spare battery can be carried with the laptop computer, but this adds additional inconvenience, cost and weight to the total unit. In addition, switching out batteries typically requires the laptop computer to be powered down, which is, at a minimum, an inconvenience, and has a potential consequence of causing the client device laptop computer to be off-line from the WLAN at a mission critical time. Furthermore, a large percentage of the cost and weight of such a mobile computer is taken up by the battery. Accordingly, to reduce battery weight and increase battery life, it is desirable to keep the client device's transceiver power usage and the accompanying battery drain at a minimum.

Therefore, there is a need for a method and system that reduces the power consumption of the battery power client device, while still transceiving data consistently and effectively, and maintaining the client device's wireless connection to the WLAN.

SUMMARY OF THE INVENTION

The present invention is a method and system for conserving battery strength of a client device, such as a laptop computer, on a wireless local area network (WLAN). The client device monitors the addresses of incoming packet messages while running at a lowest bandwidth permitted by the protocol of the client device. If the incoming packet is a "ping" packet for maintaining a connection between the client device and the WLAN, the client device responds and remains at the lowest bandwidth. If the incoming packet is a data packet addressed to another node in the WLAN, the client device ignores the incoming data packet and remains at the lowest bandwidth. If the incoming packet is a data packet addressed to the client device, then the client device bandwidth is increased to a higher bandwidth to receive subsequent data packets addressed to the client device. Subsequent incoming data packets are received by the client device until data packet transmissions cease, after which the client device returns to the lowest bandwidth. By remaining in a lowest bandwidth mode while monitoring incoming packets, the client device is able to extend the life of the client device battery.

The above, as well as additional objectives, features, and advantages of the present invention will become apparent in the following detailed written description.

BRIEF DESCRIPTION OF THE DRAWINGS

The novel features of the invention are set forth in the appended claims. The invention itself, however, as well as a preferred mode of use, further objects and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
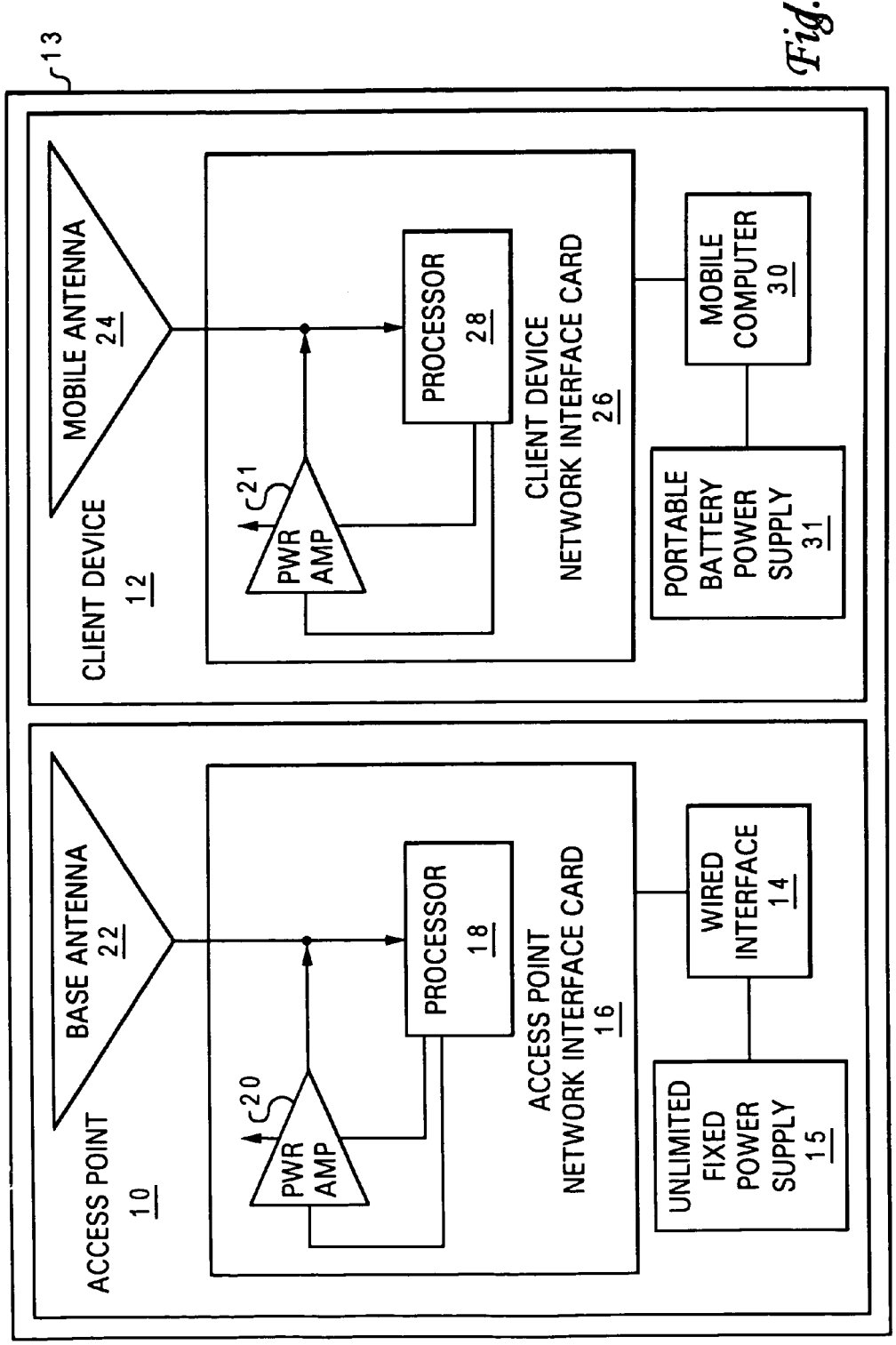
FIG. 1 depicts an exemplary wireless local area network (WLAN) used in the present invention.

With reference now to the drawings, and in particular to FIG. 1, there is depicted a diagram of portions of two exemplary nodes in a wireless local area network (WLAN) 13. For purposes of clarity and simplicity, only an access point 10 and a client device 12 are depicted. It is understood that WLAN 13 in a preferred embodiment includes multiple client devices 12, and in an alternate preferred embodiment WLAN 13 includes multiple access points 10 and multiple client devices 12.

Access point 10, which is preferably a fixed access point having an unlimited power supply 15, includes a wired interface 14, which is connected to a base antenna 22 via an access point network interface card 16. Wired interface 14 is typically a data processing device that functions as an interface to a network (not shown), such as a corporate intranet or an Internet, capable of providing data to be transmitted to client device 12 or another access point 10. In a preferred embodiment, access point 10 performs bridging and routing functions between a wired network, such as the corporate intranet or the Internet, and a wireless network as described for access point 10 and client device 12. Data is transmitted and received by access point 10 utilizing base antenna 22 and access point network interface card 16. In a preferred embodiment, access point network interface card 16, base antenna 22 and wired interface 14 are part of a wireless router capable of transmitting and receiving data between the intranet/Internet (not shown) via wired interface 14 and multiple client devices 12.

Data from wired interface 14 is processed by a processor 18 for transmission from base antenna 22. This data processing includes data modulation, which is the process of modulating a carrier radio wave to contain the data to be transmitted. Processor 18 preferably uses a frequency-hopping spread spectrum (FHSS) or a direct-sequence spread spectrum (DSSS) signal spreading scheme to improve signal-to-noise performance. In another advantageous embodiment, data modulation performed by processor 18 uses a Binary Phase Shift Keying (BPSK) modulation technique. Alternatively, processor 18 modulates data using a Quadrature Phase Shift Keying (QPSK) modulation technique, with or without Complementary Code Keying (CCK). As is appreciated by those skilled in the art of data transmission, data to be transmitted may be modulated for telemetry transmission using any modulation scheme appropriate as known in the art. Further, the data maybe transmitted using medium other than radio waves, including, but not limited to, other wavelengths of electromagnetic radiation useful for telecommunication.

Processor 18 also controls a power amplifier 20 through which processor 18 sends and controls data transmission using base antenna 22. That is, processor 18 has the capability of processing the data to be transmitted, preferably by modulation as described above, amplifying the modulated signal using power amplifier 20, and then transmitting the modulated signal as understood by those skilled in the art of telecommunications.

In addition, processor 18 has the ability to demodulate a signal received by base antenna 22. The received signal may be from one of a plurality of client devices 12 or another access point 10. Base antenna 22 sends the received signal to processor 18, which demodulates the received signal into a usable data format, preferably digital, and transmits the usable data to wired interface 14.

Client device 12, which preferably operates on a portable battery power supply 31, includes a mobile antenna 24, which transmits and receives radio signals to and from access point 10 or other client devices 12 in a manner described above for access point 10. Client device 12 includes a mobile computer 30, which is preferably a laptop computer, personal digital assistant (PDA), or similar portable computing device. Mobile computer 30 connects to a client device network interface card 26, which includes a processor 28 and a power amplifier 21 for receiving and transmitting data utilizing mobile antenna 24. Client device network interface card 26 and mobile antenna 24 are preferably components of a plug-in card for mobile computer 30, giving mobile computer 30 wireless access to WLAN 13.

Thus, as described above, access point 10 and client device 12 have transceiver capabilities to both transmit and receive wireless data signals to other nodes.

Since WLAN 13 communicates wirelessly, client device 12 may be moved about to any location within a broadcast range of WLAN 13. In a preferred embodiment, client device 12 is configured around one or more stationary access points 10, which coordinate the activity of the access points 10 and the client devices 12 in the network WLAN 13. Alternatively, the WLAN 13 can be set up in a free configuration, where the client devices 12 communicate directly with each other without using access points 13 to control network traffic.

Typically, mobile client devices 12 must continuously transmit and receive radio signals during time defined transmission cycles to remain wirelessly connected to WLAN 13. Each transmission cycle correlates temporally to a multiple of a signal carrier's wavelength. Multiple units of data may be transmitted during the transmission cycle by modulating either the amplitude or frequency of a carrier radio wave. While a small percentage of the transmission cycles are for communicating robust data from an application program or a website, most of the transmission cycles are used to maintain a communication link between client device 12 and WLAN 13, preferably between client device 12 and access point 10, through a process called "pinging." Pinging is a periodic transmission of identifier signals between client device 12 and access point 10 that are specific for client device 12, and confirms to access point 10 that client device 12 is still wirelessly connected to WLAN 13. Each identifier signal typically requires multiple transmission cycles.

Under the Institute of Electrical and Electronics Engineers (IEEE) Standard 802.11b for WLAN's, herein incorporated by reference, a constant number of symbols are transceived between nodes, such as access point 10 and client device 12, each second, where a symbol is data transceived during one transmission cycle. The number of symbols transceived per second are either one million symbols per second (1 MSps) or 1.375 MSps, depending on the data transmission rate and how the data is modulated. For example, symbols transmitted at the rate of 1 MSps maybe modulated using a technique called Binary Phase Shift Keying (BPSK) which results in one million bits per second (1 Mbps) of data being transceived. Symbols being transmitted at 1 MSps may alternatively be modulated using a more sophisticated modulation technique called Quadrature Phase Shift Keying (QPSK), resulting in 2 Mbps being transceived. Symbols transmitted at the rate of 1.375 MSps may be modulated using QPSK combined with Complementary Code Keying (CCK), which encodes 4 or 8 bits per symbol, resulting in the transceiving of 5.5 Mbps or 11 Mbps respectively. Thus, in all scenarios defined by IEEE Standard 802.11b, the nodes transmit and receive symbols at a rate of at least 1 MSps. However, the number of bits per second, or bandwidth, vary from 1 Mbps to 11 Mbps. These higher bandwidths require higher power usage by the nodes.

Data is transceived in WLAN 13 in packets. Each packet contains between 64 and 1,518 bytes of data, including a header. The header includes an identification of the data sender, the data receiver, and the type of packet. Two types of packets are a data packet and a "ping" packet. A data packet contains a datafile such as a database, graphics file, etc. A ping packet simply contains minimal information to maintain the wireless connection between the access point and the client device as described above for pinging.

When data is transmitted from access point 10 to client device 12, the transmission is typically accomplished by using a high number of data packets. Although each data packet may contain by protocol between 64 and 1,518 bytes of data, most applications, other than large file transfers, utilize data packets containing less than 200 bytes of data, including a header. The datafile being sent is therefore broken up into many data packets for transmission. For example, transmission of a datafile containing 200,000 bytes of data uses over 1,000 data packets transmitted sequentially. By breaking up the datafile into a large number of data packet subunits, transmission loss or error of a single data packet is inexpensive to re-send, due to the data packet's small size.

Figure 2:
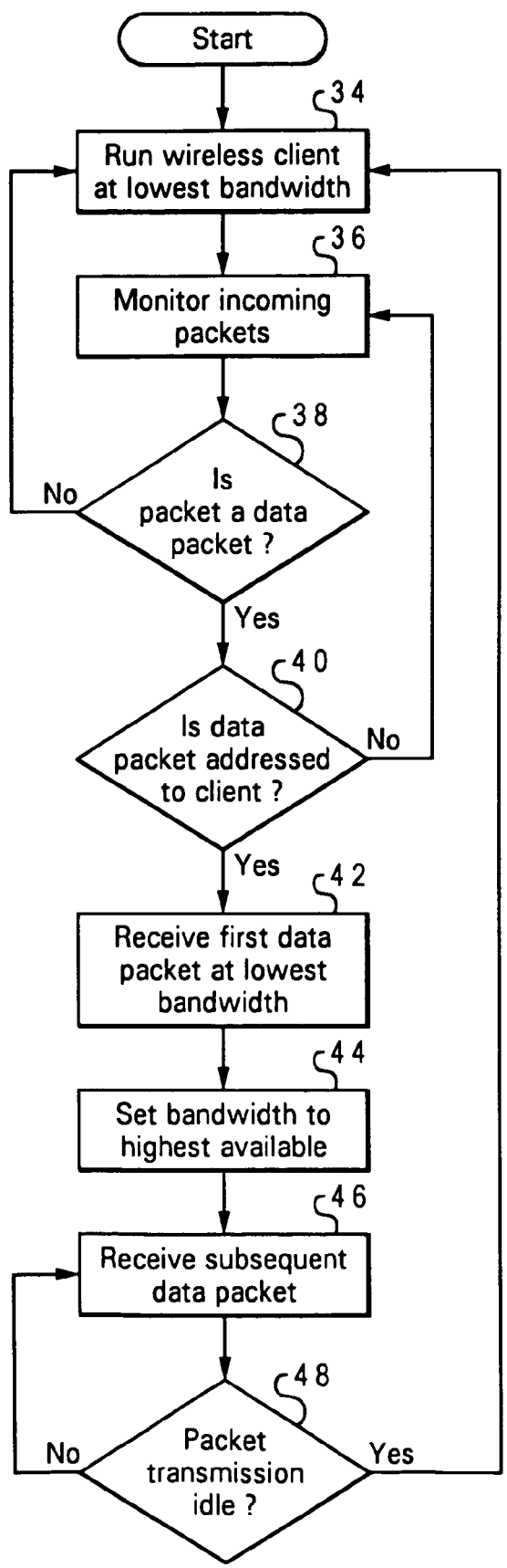
FIG. 2 is a flowchart of a preferred method used by the present invention to maximize a battery life of a WLAN client device.

With reference now to FIG. 2, there is depicted a flowchart of an advantageous method described by the present invention to conserve battery strength of a client device in a WLAN. As described in block 34, the client device is initially run at the lowest bandwidth permitted by protocol. Thus under the IEEE Standard 802.11b, the client device operates preferably at 1 Megabits per second (1 Mbps). This lowest bandwidth optimizes battery life since lower bandwidths require less power from the battery. This lowest bandwidth provides an adequate signal quality to transceive small periodic ping packets and to monitor incoming data packets. As described in block 36, the client device monitors incoming packets, and determines if the packet is a data packet, as depicted in block 38. If the packet is not a data packet, the client device continues to run at the lowest bandwidth permissible. For example, if the packet is a ping packet, the client device receives the packet and pings back to the access point to maintain a connection to the WLAN while remaining at the lowest bandwidth permissible.

If the packet is a data packet addressed to the client device, it is received by the client device, as illustrated in blocks 40 and 42. If the data packet is not addressed to the client device, the client device ignores the incoming data packet and continues to monitor incoming packets at the lowest bandwidth permissible. The address may either be a medium access control (MAC) address or a Transmission Control Protocol/Internet Protocol (TCP/IP) address.

In a preferred embodiment, data packets are transmitted in bursts, in which multiple data packets are transmitted in rapid succession to the client device. The first data packet is received at the lowest bandwidth, and the client device then sets the client devise's bandwidth to the highest permissible by protocol, as shown in block 44. In a preferred protocol of IEEE Standard 802.11b, this highest permissible bandwidth is 11 Mbps. Subsequent data packets are then received at the highest bandwidth until an idle state of packet transmission is detected, as illustrated in blocks 46 and 48, indicating no further packets are being transmitted in the burst. When the series of packets transmitted in the burst, preferably representing a large datafile, are all received, an idle state is detected by the client device indicating that no further data packets are being transmitted. The client device then returns to the lowest bandwidth setting to conserve battery power while transceiving subsequent ping packets and monitoring for new data packets addressed to the client device.

It should be appreciated that the method described above for reducing power consumption in a wireless LAN can be embodied in a computer program product in a variety of forms, and that the present invention applies equally regardless of the particular type of signal bearing media utilized to actually carry out the method described in the invention. Examples of signal bearing media include, without limitation, recordable type media such as floppy disks or compact disk read only memories (CD ROMS) and transmission type media such as analog or digital communication links.

It should further be appreciated that while the present invention is described as adjusting packet transmission rates in a WLAN, the present invention can similarly be used to adjust any data transmission rate on either a wireless or a wired computer network. Further, while the nodes in the network have been described as access point servers and client devices, the present invention is applicable to any type of node, including printers, monitors, et al., which are benefitted by a reduction of power consumption.

While the invention has been particularly shown and described with reference to a preferred embodiment, it will be understood by those skilled in the art that various changes in form and detail may be made therein without departing from the spirit and scope of the invention.

What is claimed is:

1. A method for conserving power in a network device on a network, said method comprising:
    evaluating an address of an incoming message at the network device while the network device operates at a low bandwidth;
    determining whether said incoming message is addressed to the network device; and
    upon a determination that said incoming message is addressed to the network device, determining whether said incoming message is a ping packet or a data packet, wherein a bandwidth of the network device is increased to a higher bandwidth for receiving subsequent messages addressed to the network device if said incoming message is a data packet, and wherein the bandwidth of the network device is maintained at said low bandwidth if said incoming message is a ping packet.

2. The method of claim 1, wherein said incoming and subsequent messages are packets.

3. The method of claim 1, wherein said address is a medium access control (MAC) address.

4. The method of claim 1, wherein said address is a Transmission Control Protocol/Internet Protocol (TCP/IP) address.

5. The method of claim 1, wherein said network device is a client device on a network.

6. The method of claim 5, wherein said client device is battery powered.

7. The method of claim 1, wherein said incoming message is transmitted in a wireless local area network.

8. A client device on a computer network, said client device comprising:
    means for evaluating an address of an incoming message while operating at a low bandwidth;
    means for determining whether said incoming message is addressed to the client device; and
    means for, upon a determination that said incoming message is addressed to the network device, determining whether said incoming message is a ping packet or a data packet, wherein a bandwidth of the network device is increased to a higher bandwidth for receiving subsequent messages addressed to the network device if said incoming message is a data packet, and wherein the bandwidth of the network device is maintained at said low bandwidth if said incoming message is a ping packet.

9. A access point on a computer network, said access point comprising:
    means for sending a message to a client device at a low bandwidth, said message packet including an address for said client device;

means for receiving an acknowledgment from said client device;

means for transmitting subsequent messages to said client device, at a higher bandwidth; and means for transmitting a ping packet to said client device at said low bandwidth.

10. The access point of claim 9, wherein said access point is a server.

11. The access point of claim 9, where the computer network is a wireless local area network.

12. A computer program product, residing on a computer usable medium, for conserving power consumption in a network device on a network, said computer program product comprising:

program code means for evaluating an address of an incoming message at the network device while the network device operates at a low bandwidth;

program code means for determining whether said incoming message is addressed to the network device;

program code means for, upon a determination that said incoming message is addressed to the network device, increasing a bandwidth of the network device to a higher bandwidth for receiving subsequent messages addressed to the network device;

program code means for determining if said incoming message is a ping packet; and program code means for maintaining said low bandwidth at the network device if said incoming message is said ping packet.

13. The computer program product of claim 12, wherein said address is a medium access control (MAC) address.

14. The computer program product of claim 12, wherein said address is a Transmission Control Protocol/Internet Protocol (TCP/IP) address.

15. The computer program product of claim 12, wherein said network device is a client device on the network.

16. The computer program product of claim 12, wherein said incoming message is transmitted in a wireless local area network.

* * * * *